United States Patent [19]

Derderian

[11] Patent Number: 4,709,181

[45] Date of Patent: Nov. 24, 1987

[54] SUBSLOT COVER FOR DYNAMOELECTRIC MACHINE

[75] Inventor: Scott K. Derderian, Salem, Mass.

[73] Assignee: General Electric Company, Schenectady, N.Y.

[21] Appl. No.: 19,096

[22] Filed: Feb. 26, 1987

[51] Int. Cl.[4] ............................................... H02K 3/48
[52] U.S. Cl. ..................................... 310/214; 310/42; 310/61; 310/64; 310/215
[58] Field of Search .................... 310/214, 89, 215, 91, 310/42, 52, 58, 59, 61, 64, 194, 261; 336/196, 210

[56] References Cited

U.S. PATENT DOCUMENTS

| | | | |
|---|---|---|---|
| 2,787,721 | 4/1961 | Tudge | 310/61 |
| 3,119,033 | 1/1964 | Horsley et al. | 310/64 |
| 4,251,745 | 2/1981 | Germann | 310/214 |
| 4,321,498 | 3/1982 | Vogt | 310/215 |
| 4,560,896 | 12/1985 | Vogt et al. | 310/215 |
| 4,633,116 | 12/1986 | Derderian | 310/214 |

Primary Examiner—R. Skudy
Attorney, Agent, or Firm—Jerome C. Squillaro

[57] ABSTRACT

In a dynamoelectric machine, electrical windings are held within the dynamoelectric machine rotor in axially extending slots which further include coextensive subslots for ventilation purposes. Slot insulation or slot armor is used to electrically insulate the windings from the dynamoelectric machine rotor. The slot insulation is retained in the slot by a plurality of subslot covers each of which includes a radially inner member, a radially outer member and further may include an end member. The inner members are formed at each end with a pinetree dovetail and include ventilation slots whereas the outer members are formed with ventilation half slots and depending tines. In assembly, the inner and outer members are staggered with respect to one another so that the outer member tines engage two different inner members to further strengthen the joint. The outer members included rabbeted ends so as to form overlapping joints with adjacent members to reduce electrical leakage paths.

13 Claims, 3 Drawing Figures

SUBSLOT COVER FOR DYNAMOELECTRIC MACHINE

BACKGROUND OF THE INVENTION

This invention relates to dynamoelectric machines; and, in particular, to dynamoelectric machines of the type including a rotor having electrically conductive windings disposed in a plurality of axially extending slots. Furthermore, this invention relates to a plurality of subslot covers which are joined end to end to extend in the axial direction so as to be approximately coextensive with the dynamoelectric machine slot.

A dynamoelectric machine includes a rotor body having a plurality of axially extending slots into which electrical windings are inserted. The rotor body is generally formed of a steel material whereas the rotor windings may comprise a plurality of electrically insulated copper wires. In a direct-cooled dynamoelectric machine each slot may further include an axially extending subslot for ventilation and cooling. The direct-cooled machine is one which is cooled directly by the atmosphere in which it is disposed, e.g., air or hydrogen. The subslots are part of a ventilation scheme, known in the art, for transferring gas coolant axially along the rotor. Each slot also includes provision for the radial flow of gas coolant primarily through ventilation slots in the windings.

In the aforementioned dynamoelectric machine, it is necessary to further electrically insulate the rotor windings from the rotor body, such insulation taking the form of non-conductive "slot-armor". One such insulation is shown in U.S. Pat. No. 4,321,498 issued Mar. 23, 1982 to Vogt and assigned to the assignee of the present invention. In that patent, herein incorporated by reference, it is suggested that a preferred embodiment of the invention would include a pair of electrical insulating members (slot armor), each member having a radially extending portion terminating in a base leg, the electrically insulating members disposed in each slot so that the radially extending portions are adjacent opposite walls and the base legs extend towards one another. In addition, there is an axially extending subslot cover having opposite sides formed with axially extending grooves for accepting therein each opposite base leg, of the electrical insulation members, whereby an interlocking joint is formed between the subslot cover and the insulating slot armor.

In U. S. Pat. No. 4,560,896 issued on Dec. 24, 1985 to Vogt and Derderian, and assigned to the assignee of the present invention, a slot armor comprising axially and radially extending sidewalls joined together by a radially inner, axially extending base portion to form a "U" shaped channel is positioned by a subslot cover having a planar outer member and a planar inner member. The slot armor is formed with spaced apart holes which allow the inner and outer members to be bonded to one another as well as to the slot armor positioned therebetween. Ventilation slots are thereafter machined into the slot armor subslot composite.

In U.S. Pat. No. 4,633,116, issued on Dec. 30, 1986, to S. K. Derderian and also assigned to the assignee of the present invention, a plurality of individual subslot covers are joined together, end to end in the axial direction, to be approximately co-extensive with the generator rotor slot so that when assembled with the proper insulation in the slot, the generator windings are insulated from the rotor itself. In that patent, it is further disclosed that each subslot cover has a radially inner first portion adjacent the subslot whereas a radially outer second portion is co-extensive with the first portion. Adjacent first portions are joined together at an interlocking joint and the radially outer second portion is secured to its respective inner portion. The radially outer second portions are butted together to form a continuous cover. FIG. 2 of the patent most clearly shows the aforesaid construction.

It is an object of the invention to provide an improved slot armor of the type including a plurality of subslot covers latchably secured to one another in an end to end configuration.

It is also an object of this invention to provide an improved securement at each end of individual subslot covers.

It is a further object of this invention to provide an upper or radially outer member for interconnecting adjacent subslot covers.

It is another object of the invention to provide improved electrical creepage resistance in a subslot cover construction.

SUMMARY OF THE INVENTION

An improved slot armor construction for a dynamoelectric machine includes a plurality of subslot covers formed from an Ultem (Trademark, General Electric Company) polyetherimide resin which are latchably secured, end to end, in the axial direction. Each subslot cover includes a radially inner member which is formed at one end with a male "pinetree" dovetail whereas the opposite end of the inner member is formed with a female "pinetree" dovetail. Laid end to end in a generator slot, a male pinetree dovetail is connected with an adjacent member female pinetree dovetail to form a secure complete dovetail joint. A radially outer member is formed with half ventilation slots at each opposite end and further includes a pair of depending tines located at opposite ends of the outer member and which are biased toward one another. The outer member is assembled to two adjacent inner members in a staggered fashion so that the oppositely disposed tines are able to grab the two inner adjacent members to further promote a stable assembly of adjacent inner members and an outer member. Opposite ends of each outer member are formed with opposite rabbets so that adjacent members will form a shiplap joint when assembled for improved electrical creep resistance. Finally, an outer end member has been designed with opposite ends formed with opposite rabbets so as to be able to be assembled at either end of a completed slot armor and whereas the outer end member is formed with a single depending locking key.

BRIEF DESCRIPTION OF THE INVENTION

The novel features believed characteristic of the invention are set forth in the appended claims. The invention, itself, together with further objects and advantages thereof is more particularly described in the following detailed description taken in conjunction with the accompanying drawings in which:

DETAILED DESCRIPTION OF THE INVENTION

Figure 1:
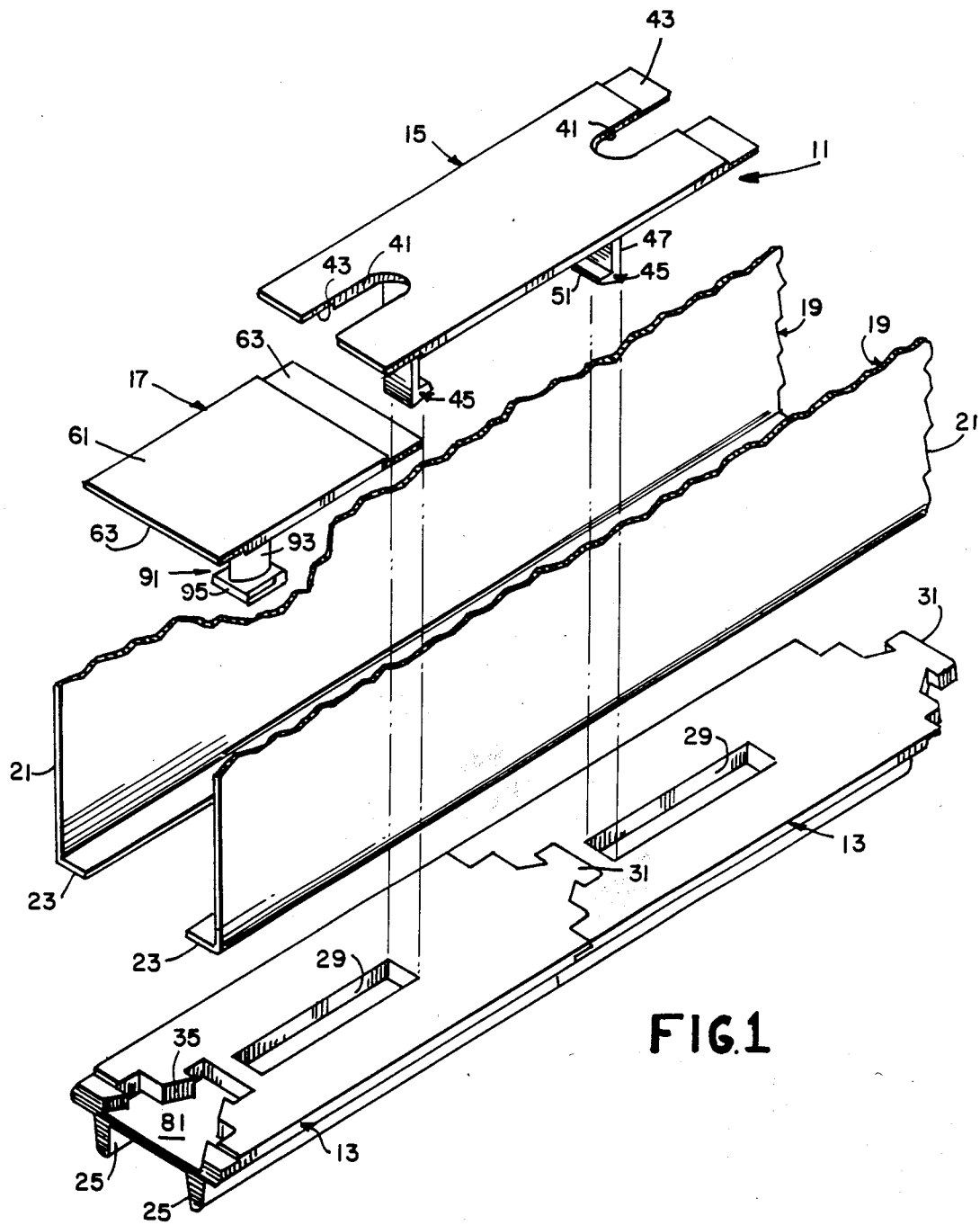
FIG. 1 is an isometric view of the present invention in disassembled form.

U.S. Pat. No. 4,633,116 issued Dec. 30, 1986 to Derderian and assigned to the assignee of the present invention is incorporated herein by reference. In that patent, in FIG. 3, a portion of a generator rotor body is shown having a slot 37 formed therein and further having a radially inner subslot 43. As is further explained in that patent, electrical windings 39 are disposed in the slot whereas with reference to FIG. 1 of the patent taken in conjunction with FIG. 3, U-shaped slot armor 16 is included between a radially inner member 19 and a radially outer member 17. The U-shaped slot armor is an aramid paper and even with the patented construction it has been found necessary to use the U-shaped construction. In accordance with the present invention, the improved design of the subslot cover inner and outer members will permit the use of relatively less rigid slot armors in a non U-shaped channel construction to be used as slot armor in a manner yet to be described in detail.

Figure 2:
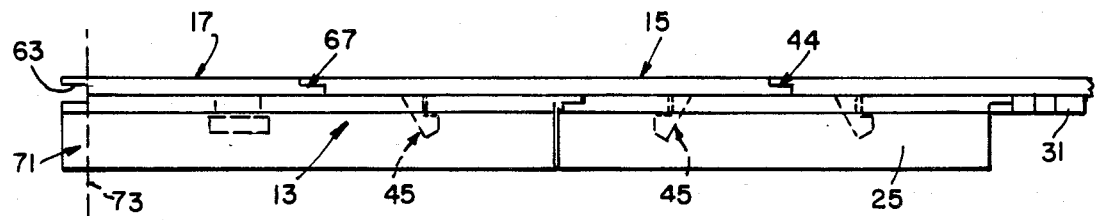
FIG. 2 is a side view of an assembled radially inner member, a radially outer member and an end member.
Figure 3:
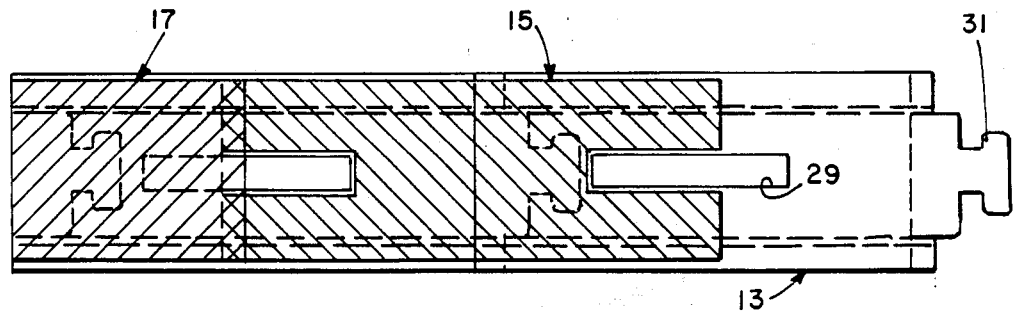
FIG. 3 is a top view of an assembled radially inner member, a radially outer member and an end member.

Referring to the drawings, FIGS. 1, 2 and 3 and in accordance with the present invention, a subslot cover 11. Further, the subslot cover for a dynamo-electric machine of the type includes a rotor having a plurality of axially extending slots for receiving electrical windings and a plurality of ventilation subslots substantially coextensive with the axially extending slots; slot insulation disposed between the slot windings and the slot (not shown) and includes a radially inner member 13, a radially outer member 15 and a radially outer end member 17. The subslot cover itself will extend the entire axial length of a generator slot and will further include a plurality of the foregoing cited members in an assembled form not yet described. The slot armor or slot insulation (as distinguished from winding insulation) may be Nomex (Trademark, DuPont Company) aramid paper in the form of a pair of axially extending L-shaped members 19, including axially extending radial sidewalls 21 with oppositely directed, axially extending, radially inner base legs 23. Alternatively, the U-shaped channel construction previously described in conjunction with U.S. Pat. No. 4,633,116 may be used.

Each radially inner member 13 may include a pair of radially dependent fins 25 which extend into the subslot in accordance with the teachings of U.S. Pat. No. 4,321,498 to George Vogt and issued Mar. 23, 1982. Each base member also includes a ventilation slot 29. A male pinetree dovetail 31 is cut out at one end of each inner member whereas a female pinetree dovetail 35 is formed at each opposite end of each inner member. Thus when the inner members are assembled end to end in an axial slot there is an interlocking joint formed with respect to mating male and female pinetree dovetails. The pinetree dovetail joint is a superior joint as compared to prior art both from the standpoint of assembly and axial strength. As contemplated herein, the pinetree dovetail joint includes any kind of a similar joint which includes a plurality of interlocking or otherwise mating complementary elements or fingers.

The radially outer member 15 is formed with a pair of ventilation half slots 41 formed at opposite ends of each outer member. The ventilation half slots are approximately U-shaped when viewed in plan to facilitate and optimize the moulding procedure in making the radially outer member. Each opposite end of the radially outer member is formed with a rabbet. A rabbet at one end of an outer member is formed opposite a rabbet formed at the outer end of an outer member; ie., one rabbet may face radially outward while another rabbet may face radially inward. The inclusion of oppositely formed rabbets at either end of the radially outer member allows an overlap or shiplap joint 44 to be formed when two outer members are assembled in the axial direction. The overlap joint 44 improves the resistance of the subslot cover and slot armor to electrical leakage. The radially outer member is also formed with a pair of depending tines 45 which are biased toward one another as is best shown in FIG. 2. Each tine includes a depending arm 47 which terminates in a hook 51 which latches against the underside of a respective one of each of two adjacent inner members through a respective ventilation slot formed in each one of the members. Each outer member has a pair of tines which are biased toward one another. The outer member is thus assembled to two inner members in a staggered fashion, ie., the outer member and its pair of tines is used to join the two inner members together in addition to the pinetree joint previously discussed and the outer member thus overlays the joined ends of two adjacent inner members. This staggered construction also enhances the assembly process while adding to the ultimate performance of the subslot cover.

There is an end member 17 attached to each end of the subslot cover 11 which includes a plurality of inner 13 and outer 15 members; and, when assembled further includes at least a pair of L-shaped slot armors wherein each base leg of each slot armor is received between inner and outer members. The end member includes a planar surface 61 which includes oppositely formed rabbets 63 at each opposite end of the planar surface. The rabbets enable the end member to be assembled at either end of the subslot cover in an overlapping joint 67 with an outer member to further improve the electrical creepage resistance of the subslot cover. At either or both ends of the subslot cover there may be an excess of material 71 which may be trimmed as for example along line 73 which renders the subslot cover flush with the end of a generator slot (not shown).

The end member is retained within a ventilation slot 29 in the inner member by means of a key 91 which includes a depending shank 93 and an enlarged rectangular button 95. To assemble the end member to the inner member, the shank and button are inserted through the ventilation slot with the long end of the rectangular button extending in the axial direction, and, then the end member is rotated ninety degrees to so that rectangular button long end is perpendicular to the axial direction and engages the underside of the inner member.

It is further pointed out that since the subslot cover is formed by an injection moulding process wherein the material may be a polyetherimide resin such as Ultem (Trademark, General Electric Co.) the female pinetree dovetail 35 may be formed with a floor 81 which further enhances the assembly process of one subslot cover to another.

The subslot cover therefore includes a radially outer member, a radially inner member and an end member. The radially inner members are more firmly assembled because of pinetree dovetail joints at each end of the inner member. In addition, there is a floor provided at each female pinetree dovetail so that the male pinetree dovetail may be more securely inserted into the female pinetree dovetail. The pinetree dovetails also contribute to the increased axial strength of the assembly. The outer member is staggered relative to two inner members so that the outer member overlies the pinetree joint for increased stability. A pair of oppositely directed tines, which depend from the outer member, each engage the undersurfaces of a respective one of the inner members which are joined at a common dovetail joint. The tines are biased toward one another so as to, in effect, tend to push the assembled lower members together. Each outer member is formed with a half ventilation slot at each end so that a complete ventilation slot will be aligned with an inner member ventilation slot when the inner and outer members are assembled. In addition, each of the outer members include oppositely formed rabbets at each end so that the final assembly of outer members include a lapped joint at each end of an outer member so as to improve resistance to electrical leakage. Finally at each end of the subslot cover an end member is assembled with an outer member in a lapped joint which may be trimmed to be flush with the generator slot.

While the invention has been disclosed in what is considered to be a preferred embodiment, other modifications may occur to those having skill in the art. It is intended to cover in the appended claims all such modifications which fall within the true spirit and scope of the invention.

What is claimed is:

1. A subslot cover for a dynamoelectric machine comprising:
    a radially inner member formed at each end with a pinetree dovetail, each inner member having an axially extending ventilation slot;
    a radially outer member formed at each end with a ventilation half slot; a pair of tines depending from the outer member having hooks directed toward one another, each of the hooks for respectively engaging a separate inner surface of one of two assembled inner members.

2. The subslot cover recited in claim 1 further including an opposite rabbet face formed at each opposite end of each outer member whereby an overlapping joint is formed between two adjacent assembled outer members.

3. The subslot cover recited in claim 1 further comprising an outer end member including a rabbet face at least at one end of the outer end member whereby the outer end member engages an adjacent outer member in an overlapping joint.

4. The subslot cover recited in claim 3 wherein the outer end member includes a planar surface having a depending shank and rectangular button at the free end of the depending shank.

5. The subslot cover recited in claim 1 wherein the inner member is formed with a male pintree dovetail at one end and a female pinetree dovetail at the other end.

6. The subslot cover recited in claim 5 wherein there is a floor formed with the female pinetree dovetail.

7. The subslot cover recited in claim 1 wherein each subslot cover has an axial length which is substantially less than the length of a dynamoelectric machine rotor slot; wherein a plurality of subslot covers are assembled end to end along the entire length of the dynamoelectric machine slot to form a continuous subslot cover.

8. A subslot cover for a dynamoelectric machine of the type including a rotor having a plurality of axially extending slots for receiving electrical windings and a plurality of ventilation subslots substantially coextensive with the axially extending slots; slot insulation disposed between the slot windings and the slot, wherein each subslot cover comprises:
    a radially inner member having a pinetree dovetail formed at each end of the inner member; and each inner member including at least one axially extending ventilation slot;
    a radially outer member formed at each end with a ventilation half slot; a pair of tines depending from the outer member and having one hook formed on each tine which is directed towards the hook formed on the other tine; the outer member being assembled to the inner member to sandwich at least a portion of the slot insulation; and,
    an outer member being staggered with respect to at least two inner members so that the tines and their respective hooks each engage a different inner member.

9. The subslot cover recited in claim 8 wherein there are a plurality of subslot covers assembled end to end in the axial direction and further comprising an end member including a planar surface having a depending shank and a rectangular button at the free end of the depending shank; the end member being assembled at least at one end of the slot for terminating a subslot cover.

10. The subslot cover recited in claim 9 wherein each outer member overlies a dovetail joint between two axially connected inner members and the ventilation half slots of two axially adjacent outer members from a complete ventilation slot aligned with an inner member ventilation slot.

11. The subslot cover recited in claim 8 wherein the hook formed at the free end of each tine engages the underside of a radially inner member through a ventilation slot in the inner member.

12. The subslot cover recited in claim 8 wherein each outer member is formed at each end with a rabbet surface, and wherein each rabbet surface is the opposite of the other rabbet surface formed on the outer member whereby overlapping joints are formed between adjacent outer members in a plurality of subslot covers.

13. The subslot cover recited in claim 9 wherein at least one end of an end member includes a rabbet surface whereby each end member is assembled with an outer member at an overlapping joint.

* * * * *